United States Patent
Jones

(10) Patent No.: US 9,520,913 B1
(45) Date of Patent: Dec. 13, 2016

(54) CELLULAR PHONE WITH AN INTEGRATED EARPHONE STORAGE APPARATUS

(71) Applicant: Tomeka Jones, Fairborn, OH (US)

(72) Inventor: Tomeka Jones, Fairborn, OH (US)

( * ) Notice: Subject to any disclaimer, the term of this patent is extended or adjusted under 35 U.S.C. 154(b) by 0 days.

(21) Appl. No.: 15/077,557

(22) Filed: Mar. 22, 2016

(51) Int. Cl.
*H04B 1/38* (2015.01)
*H04R 1/10* (2006.01)
*H04B 1/3888* (2015.01)

(52) U.S. Cl.
CPC ............ *H04B 1/3888* (2013.01); *H04R 1/105* (2013.01); *H04R 1/1016* (2013.01); *H04R 1/1033* (2013.01); *H04R 2420/07* (2013.01)

(58) Field of Classification Search
CPC ................................ H04B 1/3888; H04R 1/10
See application file for complete search history.

(56) References Cited

U.S. PATENT DOCUMENTS

| | | |
|---|---|---|
| 6,712,304 B1 | 3/2004 | Taylor |
| 6,731,956 B2 | 5/2004 | Hanna et al. |
| 8,688,174 B2 * | 4/2014 | Latham ............... H04M 1/0258 381/370 |
| 8,737,670 B2 | 5/2014 | Zheng |
| 9,071,902 B1 * | 6/2015 | Ai ........................ H04R 1/1033 |
| 2012/0314351 A1 * | 12/2012 | Kroupa .............. B65H 75/4434 361/679.01 |
| 2013/0029725 A1 * | 1/2013 | Heil-Brice .............. H04M 1/15 455/557 |
| 2015/0245126 A1 * | 8/2015 | Shaffer ................ H04R 1/1025 381/74 |

* cited by examiner

*Primary Examiner* — Brandon Miller
(74) *Attorney, Agent, or Firm* — Crossley & Stevenson Intellectual Property Law

(57) ABSTRACT

A cellular phone with an integrated earphone storage apparatus including a cellular phone and an earbud storage compartment attached to a back side of the cellular phone. The earbud storage compartment has a pair of slots including a right slot and a left slot. Each of the right slot and the left slot is continuously disposed from the front area to the back area proximal the right area and the left area, respectively. A circumference of each of the pair of slots substantially conforms to a circumference of each of a pair of earbuds of an earphone. One of the pair of earbuds is removably disposed within an opening of one of a pair of circular inner membranes disposed within an interior circumference of each of the right slot and the left slot, respectively. An earphone cord storage compartment is optionally attached to the back side of the cellular phone.

3 Claims, 4 Drawing Sheets

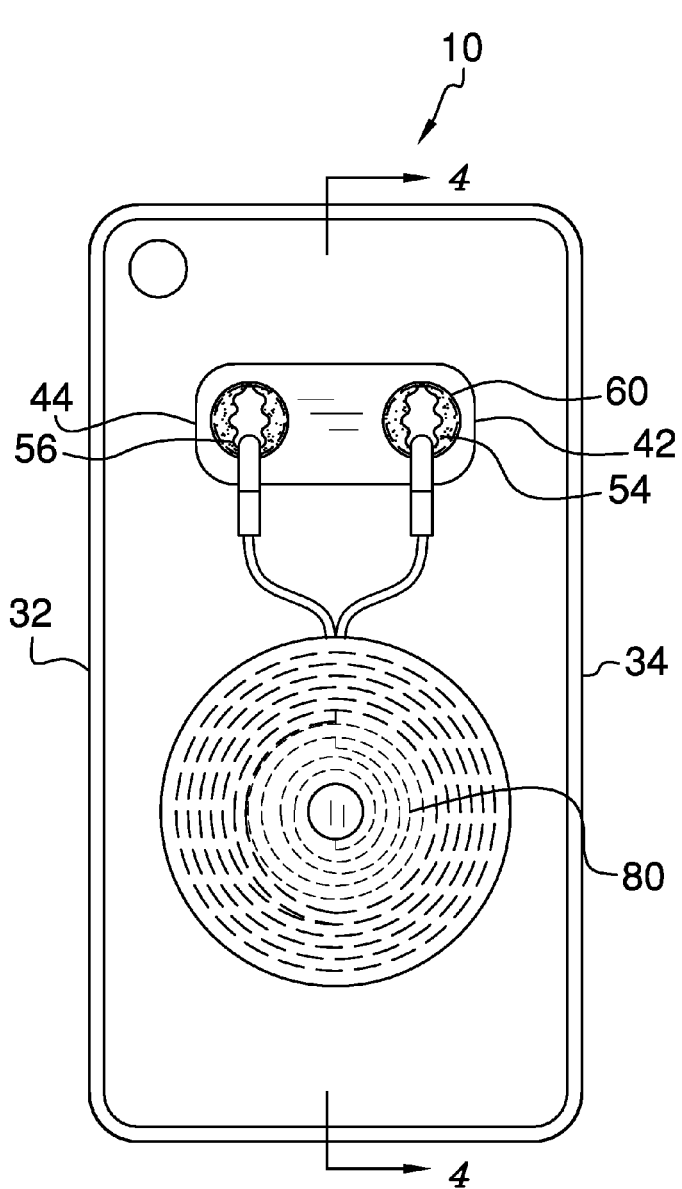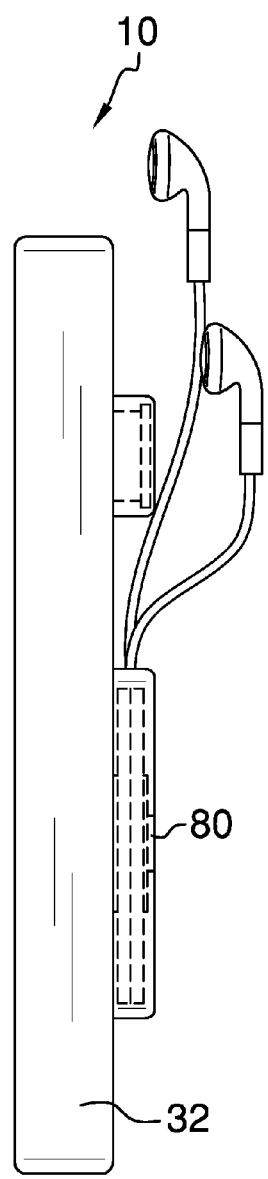
FIG. 2
FIG. 3

CELLULAR PHONE WITH AN INTEGRATED EARPHONE STORAGE APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of cellular phones and cellular phone cases are known in the prior art. However, what has been needed is a cellular phone with an integrated earphone storage apparatus including a cellular phone and an earbud storage compartment attached to a back side of the cellular phone. The earbud storage compartment has a pair of slots including a right slot and a left slot. Each of the right slot and the left slot is continuously disposed from the front area to the back area proximal the right area and the left area, respectively. What has been further needed is for a circumference of each of the pair of slots to substantially conform to a circumference of each of a pair of earbuds of an earphone, with one of the pair of earbuds removably disposed within an opening of one of a pair of circular inner membranes disposed within an interior circumference of each of the right slot and the left slot, respectively. Lastly, what has been needed is an earphone cord storage compartment optionally attached to the back side of the cellular phone for storing an earphone cord of the earphone. The cellular phone with an integrated storage apparatus thus ensures that a pair of earbuds are never lost, stolen, damaged, or left in a place apart from the cellular phone. Furthermore, in the case of a wired earphone, the cord will remain safe, secure, and unknotted in the earphone cord storage compartment.

FIELD OF THE INVENTION

The present invention relates to cellular phones and cellular phone cases, and more particularly, to a cellular phone with an integrated earphone storage apparatus.

SUMMARY OF THE INVENTION

The general purpose of the present cellular phone with an integrated earphone storage apparatus, described subsequently in greater detail, is to provide a cellular phone with an integrated earphone storage apparatus which has many novel features that result in a cellular phone with an integrated earphone storage apparatus which is not anticipated, rendered obvious, suggested, or even implied by prior art, either alone or in combination thereof.

To accomplish this, the present cellular phone with an integrated earphone storage apparatus includes a cellular phone having a front side, a back side, a display screen disposed on the front side, a top side, a bottom side, a right side, and a left side. A substantially rectangular earbud storage compartment is attached to the back side of the cellular phone proximal the top side and medially between the right side and the left side. The earbud storage compartment has a front area, a back area, a right area, a left area, and a pair of slots including a right slot and a left slot. Each of the right slot and the left slot is continuously disposed from the front area to the back area proximal the right area and the left area, respectively. A circumference of each of the pair of slots substantially conforms to a circumference of each of a pair of earbuds of an earphone. Each of a right inner membrane and a left inner membrane of a pair of rubberized circular inner membranes is disposed within an interior circumference of each of the right slot and the left slot, respectively, of the earbud storage compartment. Each of the right inner member and the left inner member has an opening having a ridged inner surface around the opening. One of the pair of earbuds is removably disposed within one of the pair of slots.

The pair of earbuds is optionally wired and, alternately, wireless. The pair of wireless earbuds has an earbud docking station disposed proximal the cellular phone that is attached to a power source and configured to charge the pair of earbuds when not in use. The pair of wired earbuds further includes a hollow circular disc-shaped earphone cord storage compartment attached to the back side of the cellular phone underneath the earbud storage compartment. The earphone cord storage compartment has a top portion, an aperture medially disposed through the top portion, and a spring-loaded spool medially disposed within the earphone cord storage compartment. An earphone cord of the earphone has a pair of first ends attached to the pair of earbuds and a second end electrically connected to an audio output port of the cellular phone disposed on a portion of the cellular phone covered within a circumference of the earphone cord storage compartment. The earphone cord is retractable and, alternately, extendable on the spring-loaded spool of the earphone cord storage compartment, while the earphone cord is disposed through the aperture of the earphone cord storage compartment.

Thus has been broadly outlined the more important features of the present cellular phone with an integrated earphone storage apparatus so that the detailed description thereof that follows may be better understood and in order that the present contribution to the art may be better appreciated.

BRIEF DESCRIPTION OF THE DRAWINGS

Figures

FIG. 2 is a front elevation view.

FIG. 3 is a side elevation view.

DETAILED DESCRIPTION OF THE DRAWINGS

Figure 1:
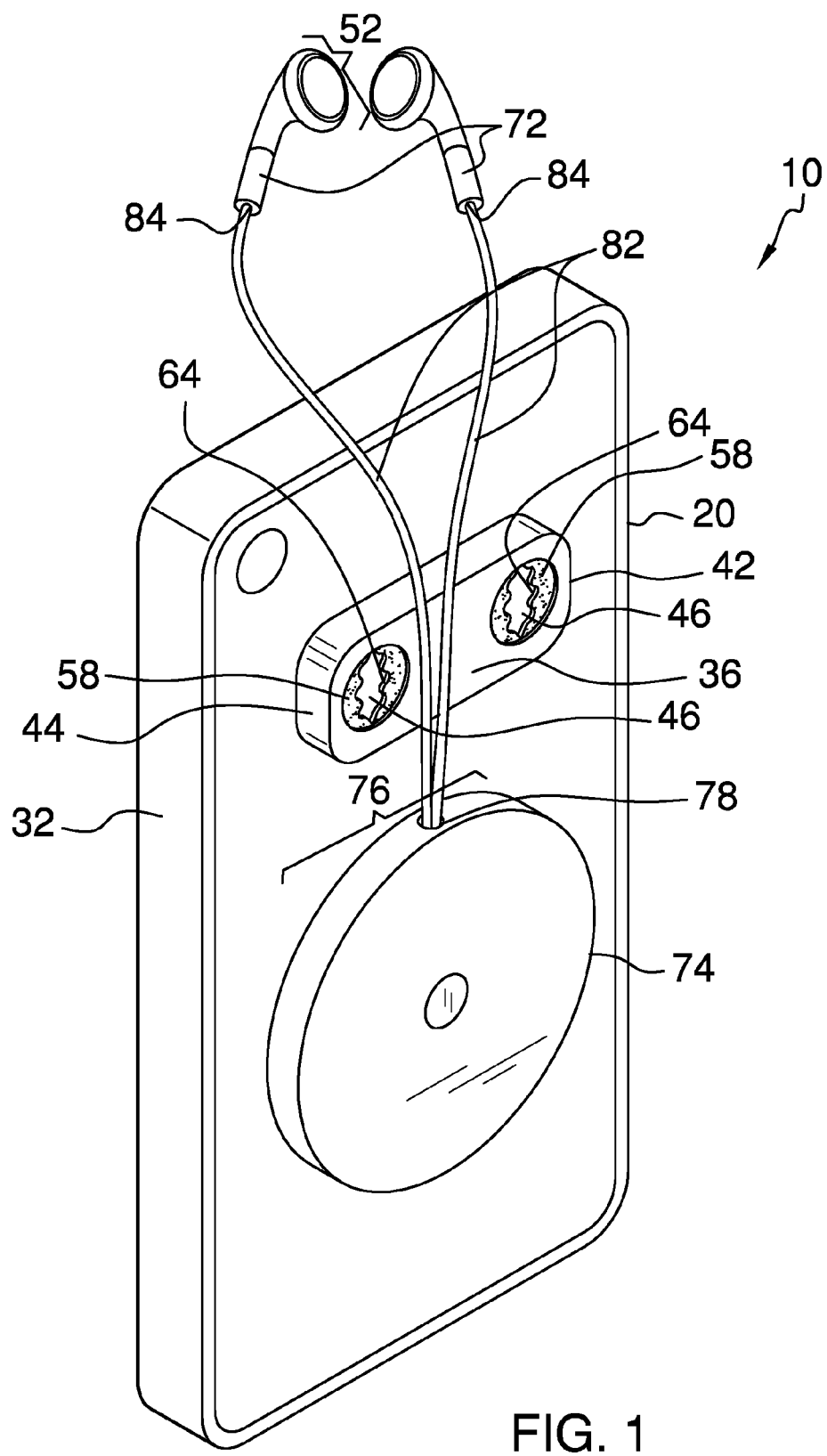
FIG. 1 is a front isometric view showing a pair of wired earbuds.
Figure 4:
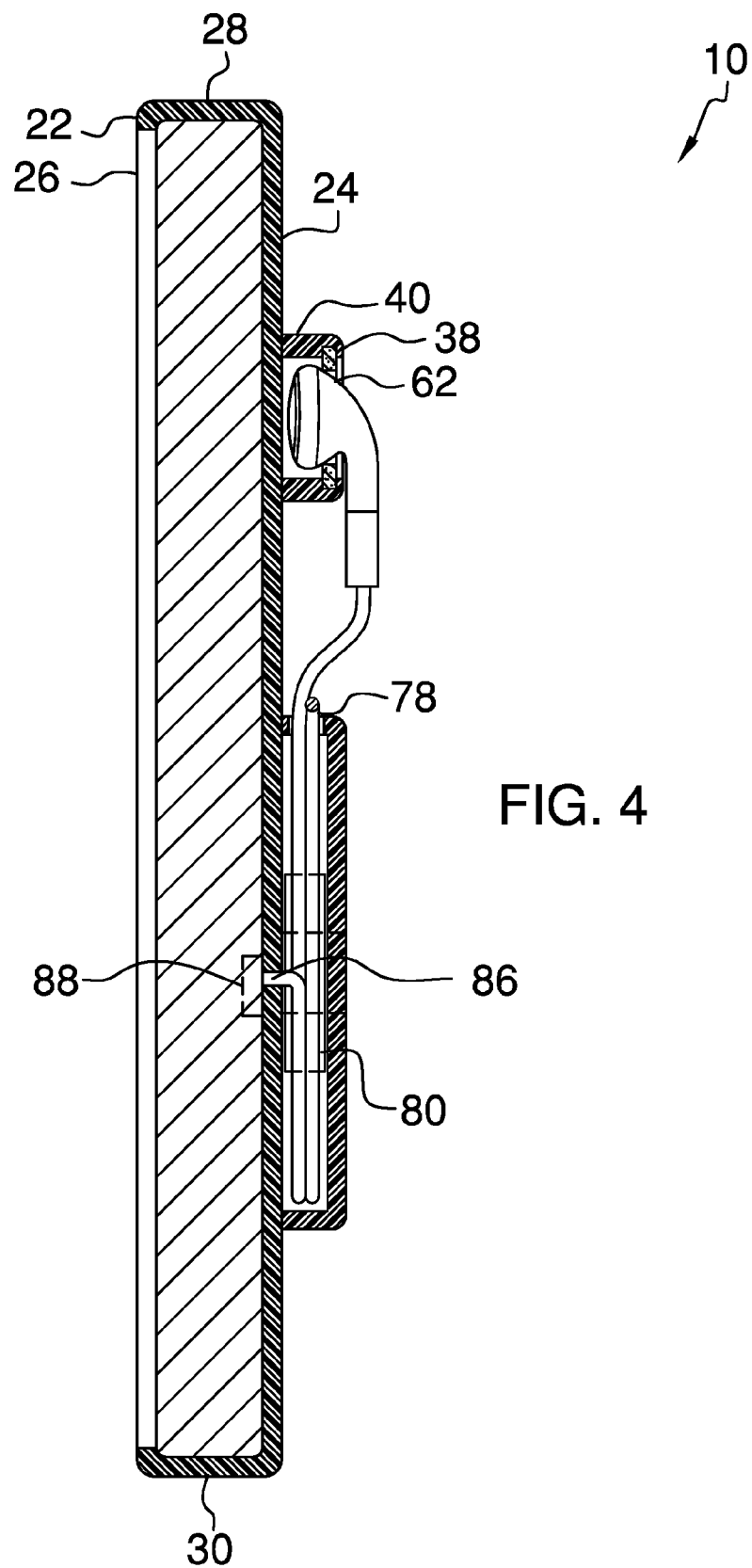
FIG. 4 is a cross-sectional view taken along line 4-4 of FIG. 2.
Figure 5:
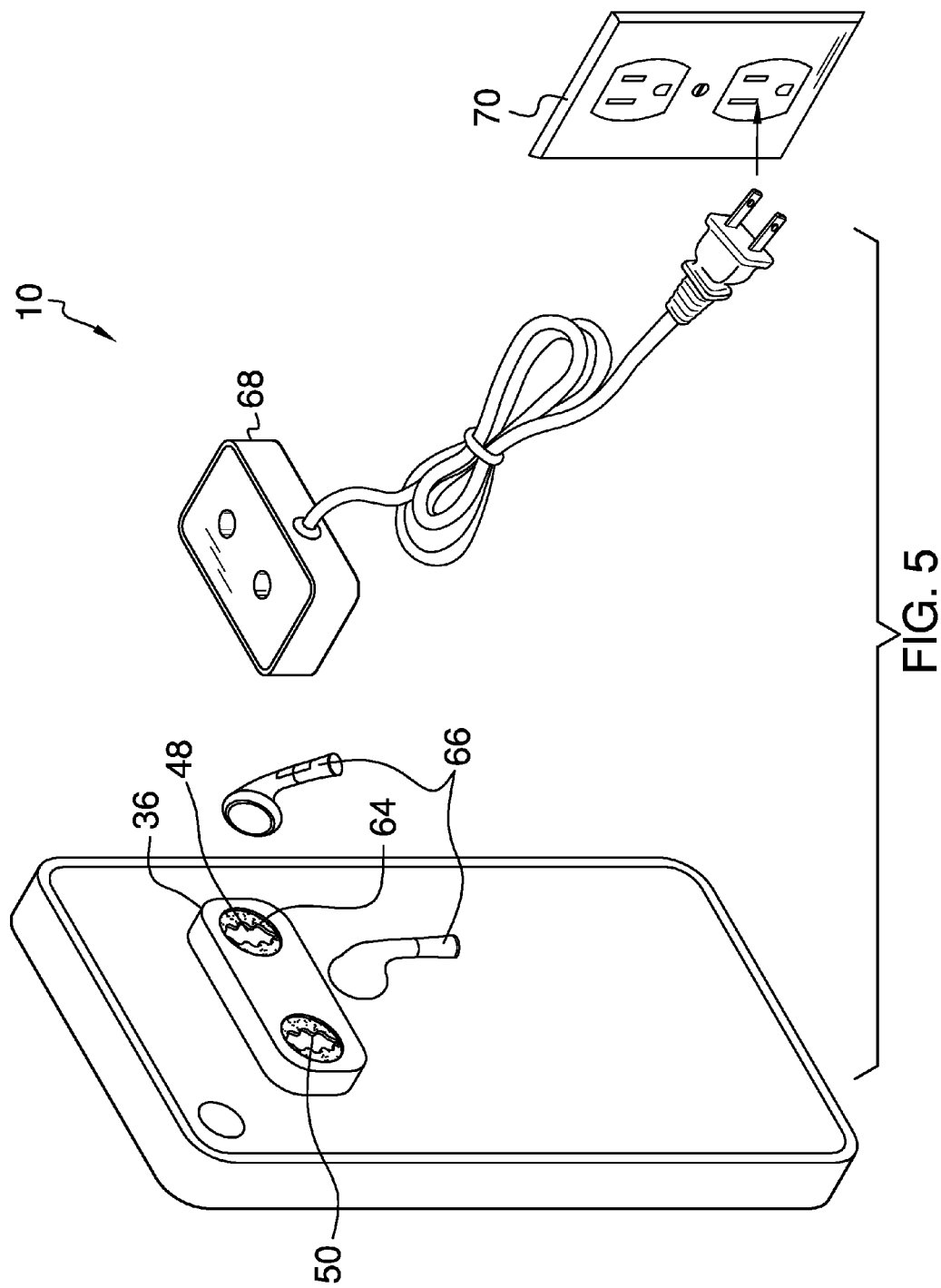
FIG. 5 is a front isometric view showing a pair of wireless earbuds.

With reference now to the drawings, and in particular FIGS. 1 through 5 thereof, an example of the instant cellular phone with an integrated earphone storage apparatus employing the principles and concepts of the present cellular phone with an integrated earphone storage apparatus and generally designated by the reference number 10 will be described.

Referring to FIGS. 1 through 5 the present cellular phone with an integrated earphone storage apparatus 10 is illustrated. The cellular phone with an integrated earphone storage apparatus 10 includes a cellular phone 20 having a front side 22, a back side 24, a display screen 26 disposed on the front side 22, a top side 28, a bottom side 30, a right side 32, and a left side 34. A substantially rectangular earbud storage compartment 36 is attached to the back side 24 of the cellular phone 20 proximal the top side 28 and medially between the right side 32 and the left side 34. The earbud storage compartment 36 has a front area 38, a back area 40, a right area 42, a left area 44, and a pair of 46 including a right slot 48 and a left slot 50. Each of the right slot 48 and the left slot 50 is continuously disposed from the front area 38 to the back area 40 proximal the right area 42 and the left area 44, respectively. A circumference of each of the pair of slots 46 substantially conforms to a circumference of each of a pair of earbuds of an earphone 52. Each of a right inner membrane 54 and a left inner membrane 56 of a pair of rubberized circular inner membranes 58 is disposed within an interior circumference 60 of each of the right slot 48 and the left slot 50, respectively, of the earbud storage compartment 36. Each of the right inner member 54 and the left inner member 56 has an opening 62 having a ridged inner surface 64 around the opening 62. One of the pair of earbuds 52 is removably disposed within one of the pair of slots 46.

The pair of earbuds 52 is optionally wired and, alternately, wireless. The pair of wireless earbuds 66 has an earbud docking station 68 disposed proximal the cellular phone 20 that is attached to a power source 70 and configured to charge the pair of earbuds 66 when not in use. The pair of wired earbuds 72 further includes a hollow circular disc-shaped earphone cord storage compartment 74 attached to the back side 24 of the cellular phone 20 underneath the earbud storage compartment 36. The earphone cord storage compartment 74 has a top portion 76, an aperture 78 medially disposed through the top portion 76, and a spring-loaded spool 80 medially disposed within the earphone cord storage compartment 74. An earphone cord of the earphone 82 has a pair of first ends 84 attached to the pair of earbuds 52 and a second end 86 electrically connected to an audio output port of the cellular phone 88 disposed on a portion of the cellular phone 20 covered within a circumference of the earphone cord storage compartment 74. The earphone cord 82 is retractable and, alternately, extendable on the spring-loaded spool 80 of the earphone cord storage compartment 74, while the earphone cord 82 is disposed through the aperture 78 of the earphone cord storage compartment 74.

What is claimed is:

1. A cellular phone with an integrated earphone storage apparatus comprising:
   a cellular phone having a front side, a back side, a display screen disposed on the front side, a top side, a bottom side, a right side, and a left side;
   a substantially rectangular earbud storage compartment attached to the back side of the cellular phone proximal the top side and medially between the right side and the left side, the earbud storage compartment having a front area, a back area, a right area, a left area, and a pair of slots comprising a right slot and a left slot, wherein each of the right slot and the left slot is continuously disposed from the front area to the back area proximal the right area and the left area, respectively;
   wherein a circumference of each of the pair of slots substantially conforms to a circumference of each of a pair of earbuds of an earphone; and
   a pair of rubberized circular inner membranes comprising a right inner membrane and a left inner membrane, each of the right inner membrane and the left inner membrane disposed within an interior circumference of each of the right slot and the left slot, respectively, of the earbud storage compartment, wherein each of the right inner member and the left inner member has an opening having a ridged inner surface around the opening;
   wherein one of the pair of earbuds is removably disposed within one of the pair of slots.

2. The cellular phone with an integrated earphone storage apparatus of claim 1 wherein the pair of earbuds of the earphone is wireless.

3. The cellular phone with an integrated earphone storage apparatus of claim 1 further comprising:
   a hollow circular disc-shaped earphone cord storage compartment attached to the back side of the cellular phone underneath the earbud storage compartment, the earphone cord storage compartment having a top portion, an aperture medially disposed through the top portion, and a spring-loaded spool medially disposed within the earphone cord storage compartment; and
   an earphone cord of the earphone having a pair of first ends attached to the pair of earbuds and a second end electrically connected to an audio output port of the cellular phone disposed on a portion of the cellular phone covered within a circumference of the earphone cord storage compartment, wherein the earphone cord is retractable and, alternately, extendable on the spring-loaded spool of the earphone cord storage compartment with the earphone cord disposed through the aperture of the earphone cord storage compartment.

* * * * *